United States Patent [19]

Harris

[11] Patent Number: 4,755,190
[45] Date of Patent: Jul. 5, 1988

[54] SOLID FUEL FEED SYSTEM

[75] Inventor: William G. Harris, Seattle, Wash.

[73] Assignee: The Boeing Company, Seattle, Wash.

[21] Appl. No.: 840,224

[22] Filed: Mar. 17, 1986

Related U.S. Application Data

[62] Division of Ser. No. 762,004, Aug. 2, 1985, Pat. No. 4,650,660.

[51] Int. Cl.$^4$ .............................. B01J 7/00; B01J 8/12
[52] U.S. Cl. ........................................ 48/61; 422/213;
422/219; 422/232; 141/55; 141/57; 141/61; 141/99; 141/100
[58] Field of Search ....................... 422/213, 219, 232; 48/61; 141/55, 57, 61, 99, 100; 414/217; 406/48, 145, 146; 210/95

[56] References Cited

U.S. PATENT DOCUMENTS

| | | | |
|---|---|---|---|
| 700,613 | 5/1902 | Evans | 210/95 |
| 2,338,606 | 1/1944 | Voorhees | 422/219 |
| 2,486,650 | 11/1949 | Hepp et al. | 422/219 |
| 3,762,773 | 10/1973 | Schroeder | 406/48 |
| 3,911,972 | 10/1975 | Hübers et al. | 141/61 |
| 4,064,226 | 12/1977 | Becker et al. | 422/232 |
| 4,191,500 | 3/1980 | Oberg et al. | 422/232 |
| 4,247,240 | 1/1981 | Schora, Jr. et al. | 422/232 |
| 4,401,402 | 8/1983 | Casperson | 422/232 |

Primary Examiner—David L. Lacey
Attorney, Agent, or Firm—John C. Hammar

[57] ABSTRACT

Metal particles are introduced to reactor beds in a hydrogen generator without introducing contaminating oxygen or nitrogen to the generator. The particles are protected against oxidation under an inert gas atmosphere, are flooded with water prior to injection into the generator, and are further flooded with hydrogen gas drawn from the generator to replace the water prior to injection. The generator includes a receiving hopper for the metal particles and an injector connected to the hopper. Particles introduced to the receiver are flooded with the inert gas and are transferred to the injector (which is flooded with water) by gravity. The water is displaced with gas from the generator prior to injecting the particles into the generator with a reciprocating piston associated with the injector.

12 Claims, 1 Drawing Sheet

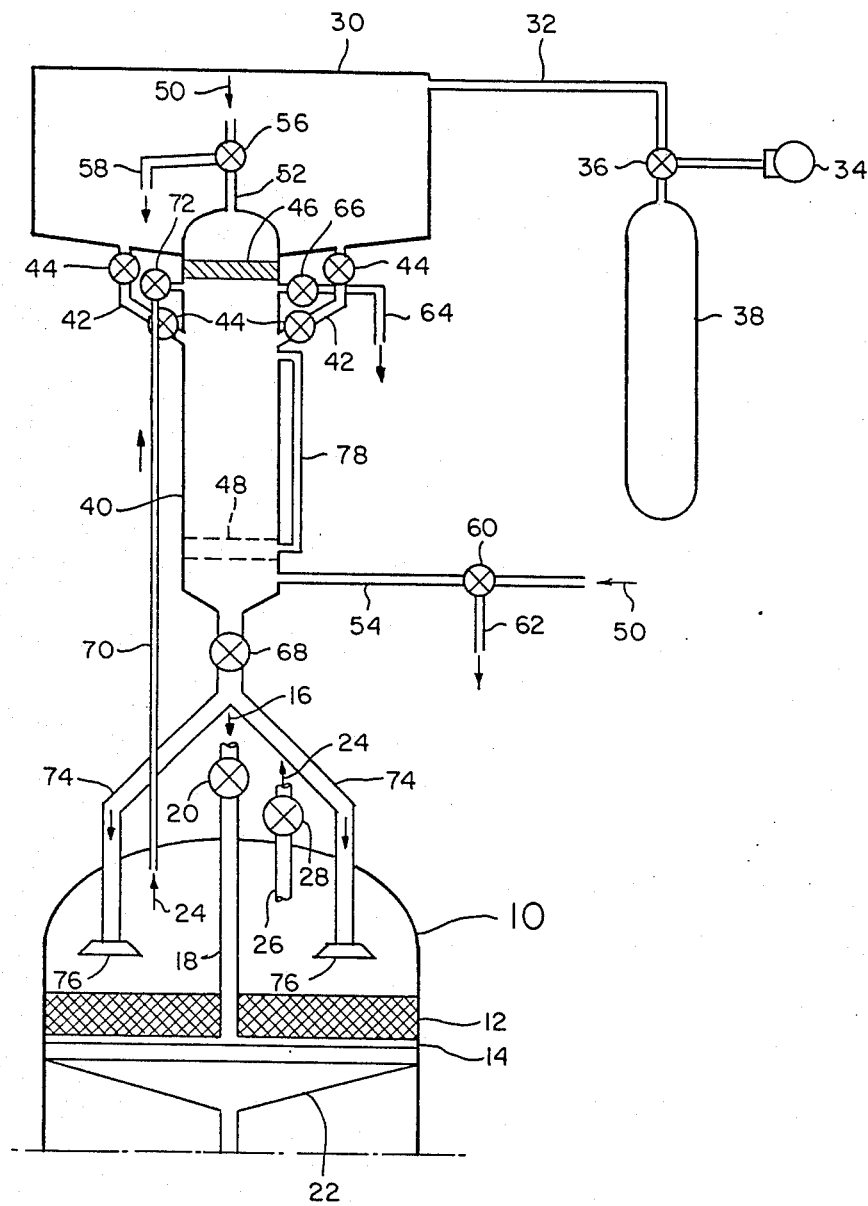

SOLID FUEL FEED SYSTEM

The United States Government has rights in this invention pursuant to Contract No. F04704-82-C-0038.

REFERENCE TO RELATED APPLICATION

This application is a divisional application based upon U.S. patent application Ser. No. 762,004, filed Aug. 2, 1985, now U.S. Pat. No. 4,650,660.

TECHNICAL FIELD

The present invention relates to a fuel feed system especially adapted for feeding solid metal particles to reactor beds of a hydrogen generator without introducing oxygen, nitrogen, or other contaminants to the controlled environment of the generator.

BACKGROUND ART

When seeking to replenish reactor beds that are consumed in the creation of pure gases, a problem exists for introducing the metals needed in the beds into the controlled environment of the generator without introducing external contaminants into the generator. The problem is particularly acute with solid fuels that can be oxidized.

SUMMARY OF THE INVENTION

The solid fuel feed system of the present invention is especially adapted for use with a closed-cycle hydrogen gas generator that produces essentially pure hydrogen gas for use in a hydrogen-chlorine fuel cell. The generator has a controlled environment tolerant of only small amounts of contaminants such as oxygen or nitrogen. Since metal reactants are consumed by hydrochloric acid to generate the hydrogen gas, it is important to replenish the reactor beds of metal particles without introducing contaminants to the generator.

Metal particles are initially placed in a holding tank vented to the atmosphere. Air entrained within the particles is replaced with an inert gas, such as nitrogen, that is relatively insoluble in water and that is designed to prevent damaging oxidation of the particles during storage. Prior to introducing the particles into the reactor, the inert gas is replaced with water to avoid contamination of the generator with the gas. Since the reaction in the hydrogen generator involves the in-feed of dilute hydrochloric acid, any entrained water which is introduced with the particles will not prove damaging to the environment. Still, before introducing the particles to the generator, the water is generally replaced with a hydrogen-containing gas, preferably bled from the generator and introduced into the holding tank to drive the water from the tank. Only then are the particles injected into the generator. Injection is usually accomplished by moving a piston along the tank to force the particles through an outlet or connecting conduit between the tank and generator. After injection, the tank can be vented to the atmosphere to allow the addition of new particles to the tank for further processing.

Preferably, the tank is made in two sections; one, a receiving hopper that can be vented to the atmosphere, evacuated, and filled to a positive pressure with inert gas, and, two, an injector which may filled with water prior to transfer of the metal particles from the receiving hopper to the injector and which can subsequently be filled with hydrogen gas for driving the waste water from the tank to prepare the particles for injection into the generator. The second section is isolated from the atmoshpere at all times, thereby reducing the probability of introducing contaminants to the generator.

These and other features of the apparatus will be more clearly understood by reference to the accompanying drawing and detailed description.

BRIEF DESCRIPTION OF THE DRAWING

The FIGURE is a detailed schematic of a preferred feed system of the present invention.

BEST MODE CONTEMPLATED FOR CARRYING OUT THE INVENTION

The solid fuel feed system of the present invention will be described with reference to a hydrogen generator, which is the contemplated use for this system. Those skilled in the art will recognize other applications for the system.

A hydrogen generator 10 includes one or more reaction beds 12 of metal particles positioned on trays 14 within the generator 10. Dilute hydrochloric acid 16 is introduced to one of the reactor beds 12 through an in-feed line 18. Control of the feed is achieved with a valve 20 within the line 18. Hydrochloric acid flows through the reactor bed 12 and reacts with the pure metal particles to generate hydrogen gas and a solution of metal chlorides. The solution which emerges from the top of reactor bed 12 passes to a collector 22 and is directed to the next processing stage of the reactor or to a waste storage facility. Essentially pure hydrogen gas 24 is collected in a bonnet of the generator 10 and is drawn from the generator 10 through a product line 26 that includes a pressure regulating valve 28 to ensure that the pressure within the generator 10 is always above atmospheric.

The reaction of the acid on the metal particles depletes the bed so that, during continuous operation of the generator 10, additional metal particles must be added To ensure that the hydrogen product gas 24 is substantially pure and is suitable for use in a hydrogen-chlorine fuel cell, it is important that introduction of new fuel (i.e., metal particles) be achieved without introducing oxygen, nitrogen, or other contaminants into the controlled environment of the generator 10.

The preferred fuel feed system includes a receiving hopper 30 having an inlet (not shown) to allow introduction of metal particles into the receiving hopper 30 when the hopper is vented to the atmosphere. The hopper 30 is connected through a vacuum line 32 to a vacuum pump 34, which may be used to evacuate the hopper 30 to a pressure of about 1 psia or less, after introducing the metal particles to the hopper. The vacuum line 32 is also connected through a two position valve 36 to a reservoir 38 of an inert gas, such as nitrogen. Following evacuation of the hopper 30, the vacuum pump is stopped, and the valve 36 is opened to allow a positive pressure of gas to enter the receiving hopper 30. This gas should be relatively insoluble in water and should be essentially nonreactive with the metal particles. The gas is used in the hopper to prevent any damaging oxidation of the metal particles while they are stored in the hopper prior to injection into the hydrogen generator 10.

The receiving hopper 30 is connected to an injector 40 by one or more conduits 42 that allow metal particles within the receiving hopper 30 to be fed by gravity or otherwise to the injector 40. Each conduit 42 preferably includes two or more valves 44 which can be closed to isolate the injector 40 from the receiving hopper 30. These valves 44 are particularly important to alleviate hydrogen leakage between the injector and the receiving hopper.

The injector 40 is generally cylindrical, and includes a piston 46 that can reciprocate within the injector 40 between the upper position shown in solid lines in the Figure and a lower position schematically illustrated by the dotted lines 48 in the FIG. 4. The movement of the piston 46 is achieved by injecting water 50 behind the piston 46 through a port 52 at the top of the injector 40 or an exhaust port 54 near the bottom of the injector 40. A control valve 56 in the water infeed line above the port 52 allows the flow of water to be controlled and allows fluid to be diverted from the injector 40 through the port 52 to an exhaust line 58 to drain the injector 40 when the piston 46 moves from the lower position 48 to the upper position.

Similarly, a control valve 60 connected with the exhaust port 54 allows the water 50 to be shut-off and connection of the injector 40 to a waste line 62 for draining.

An overflow drain 64, including a flow control valve 66 is connected to the injector 40 above the connecting conduits 42 to allow drain of water 50 from the injector 40 when metal particles are transferred from the receiving hopper 30 to the injector 40. Entrained gas that is conveyed to the injector 40 from the receiving hopper by the particles is of a lower density than the water within the injector 40, rises to the top of the injector, and is bled from the injector through the drain 64. The metal particles, accordingly, displace water within the injector and form a mixture of the metal particles and water only.

A valve 68 at the bottom of the injector 40 isolates the injector from the generator 10, and allows the injector 40 to be filled with water 50 through line 54 prior to transfer of metal particles from the receiving hopper 30 to the injector 40, as has been described. With metal particles in the injector 40, the control valves 44 and 66 are closed, and hydrogen gas 24 flows into the injector from the generator 10 through line or shunt 70 by opening a control valve 72 in the line. The gas 24 enters the injector 40 near the upper end of the injector in the vicinity of the drain 64. With the valve 72 open, the control valve 60 is opened to allow the entering gas to drive the water within the particles in the injector 40 out the waste line 62, leaving a combination of metal particles, hydrogen gas, and incidental entrained water within the injector 40. Then, the control valve 72 is closed and the valve 68 is opened. Water pressure is created behind piston 46 to drive the piston downwardly in the injector 40 and to force metal particles through fuel supply lines 74 into the generator 10. Distributor heads 76 rotate under the pressure of the metal particles in the supply lines 74 to distribute the particles uniformly over the bed 12.

A sight glass 78 on the side of the injector 40 allows the operator to know the level of liquid in the injector 40 by viewing the meniscus between the liquid and gaseous phases.

While a preferred embodiment of the invention has been shown and described, those skilled in the art will readily recognize alterations, modifications, or variations that might be made to the preferred embodiment without departing from the inventive concept. The description and drawing are meant to illustrate the invention and not to limit it. The claims should be interpreted liberally in light of the description and drawing to protect the invention as described in the preferred embodiment and its full range of equivalents. The claims should only be limited as is necessary in view of the pertinent prior art.

I claim:

1. An apparatus for introducing metal particles to a reaction bed within a hydrogen generator without contaminating the controlled environment of the generator by introducing oxygen or nitrogen, comprising:
   (a) an injector tank having an input end and an output end including a particle outlet;
   (b) a valve at the output end of the tank for connecting the tank to a hydrogen generator;
   (c) a reciprocating piston within the tank for forcing metal particles from the tank through the valve;
   (d) an inlet for metal particles near the input end of the tank;
   (e) a gas port in the tank for introducing gas to the tank near the input end and above the metal inlet;
   (f) an exhaust port in the tank below the gas port near the output end to allow gas entering the tank to force fluid out the exhaust port; and
   (g) fluid inlet means connected to the tank for introducing fluid to the tank.

2. The apparatus of claim 1 in combination with a hydrogen generator and further comprising a shunt for directing gas from the generator to the tank, the shunt connecting the generator with the gas port.

3. The apparatus of claim 1 further comprising at least two feed lines, a first feed line attached to the top of the tank on one side of the piston and a second feed line associated and communicating with the exhaust port on the other side of the piston, wherein the piston is driven to reciprocate through the first and second feed lines.

4. The apparatus of claim 1 further comprising;
   (a) a storage hopper for receiving the particles;
   (b) a vacuum pump connected to the hopper to evacuate the hopper;
   (c) a nitrogen bleed line connected to the hopper to feed nitrogen to the evacuated hopper and to create a positive nitrogen pressure within the hopper to ensure that air is excluded from the hopper;
   (d) feed means for transferring particles from the hopper to the tank, the feed means being connected with the tank inlet; and
   (e) a source of nitrogen connected to the nitrogen bleed line.

5. The apparatus of claim 4 wherein the feed means includes a conduit and at least two valves in the conduit to alleviate leakage of gas between the tank and hopper.

6. The apparatus of claim 5 further comprising a sight glass on the tank for determining the level of liquid in the tank.

7. The apparatus of claim 1 further comprising a drain in the tank near the input end.

8. A feed system for feeding metal particles to a reaction bed of a hydrogen generator, comprising:
   (a) a receiving hopper for receiving the metal particles;
   (b) means for introducing an inert gas to the hopper;
   (c) an injector connected to the hopper and including a particle outlet;
   (d) a particle receiving port in the injector;
   (e) means for transferring the particles from the hopper to the injector through the port;
   (f) means for flooding the injector with water;

(g) means for displacing water in the injector with gas bled from a generator (h) a reciprocating piston within the injector for forcing the particles from the injector through the particle outlet into the generator, the piston being movable from a first position above the port to a second position below the port; and (i) vacuum means in fluid communication with the hopper for evacuating the hopper.

9. The system of claim 8 further comprising fluid drive means positioned with respect to the injector for reciprocating the piston between the two positions.

10. The system of claim 9 wherein the transferring means includes at least two valves in series in a feed line that connects the hopper to the port, the valves ensuring that the injector can be isolated from the hopper.

11. The system of claim 10 further comprising means for determining the level of water within the injector.

12. The system of claim 9 wherein the fluid drive means includes a first feed line attached to the tank for conveying water to the injector above the port to move the piston from the first position to the second position, a first drain in fluid communication with the injector above the port, a second feed line attached to the tank for conveying water to the injector below the port to move the piston from the second position to the first position, and a second drain in fluid communication with the injector below the port.

* * * * *